Sept. 17, 1968      W. O. HENSCHKE      3,402,308

ROTARY ACTUATED LINEAR MOTOR

Filed Jan. 19, 1965

INVENTOR.
William O. Henschke
BY
Johnson and Kline
ATTORNEYS

United States Patent Office 3,402,308
Patented Sept. 17, 1968

3,402,308
ROTARY ACTUATED LINEAR MOTOR
William O. Henschke, Avon, Conn., assignor to The Superior Electric Company, Bristol, Conn., a corporation of Connecticut
Filed Jan. 19, 1965, Ser. No. 426,635
5 Claims. (Cl. 310—80)

The present invention relates to an electric motor of the type having a stationary stator and a rotating rotor and more particularly to such a motor which translates the rotor motion into a linear motion.

While it has heretofore been proposed to utilize a rotary electric motor to provide a movement which is changed into linear motion by a cooperating threaded rod and a nut, such devices have not been found completely satisfactory. One of the reasons may be traced to the use of a plurality of nuts operating with the rod which renders the device relatively expensive by also requiring that the parts have accurate dimensions with small tolerances in order to prevent binding of one or both of the nuts on the rod. Moreover, in such a construction, while binding may be avoided with one temperature range, as the range is increased, the increased change in the dimensions of the parts again renders the device subject to binding and hence unsatisfactory operation.

An object of the present invention is to provide a linear motor of the type having a rotating rotor which is economical to manufacture, easy to assemble and obviates the necessity of its parts having very accurate dimensions with only small tolerances.

Another object of the present invention is to provide such a motor which is capable of satisfactory operation at any temperature of the motor over a relatively wide range of temperature by substantially eliminating or compensating for dimensional changes occurring with changes in temperature.

A further object of the present invention is to provide a motor of the above type which substantially prevents the linear thrust of the motor from being transmitted to the rotating rotor.

Another object of the present invention is to provide a motor that achieves the above objects but yet has a minimum number of parts and may employ many parts that are used in similar type rotary motors.

In carrying out the specific embodiment of the present invention disclosed herein there is provided a rotary motor of the type disclosed in U.S. Patent No. 2,931,929 that is assigned to the assignee of the present invention. Such a motor has a stator having a plurality of poles with a winding means per pole and a permanent magnet rotor that is mounted within the stator to be moved with changes in energization of the stator winding means. The rotor and stator are each formed with cooperating peripheral teeth and thus the motor is a stepping motor that steps or moves a determined arc for each change in energization.

In order to translate the rotary stepping movement of the above-described motor into a linear movement, the rotor is mounted on a hollow shaft that is mounted for rotation with respect to the stator and the tube carries at one end a ball nut. Cooperating with the ball nut is a threaded shaft that extends through the hollow shaft and as the latter and the nut are rotated, the ball nut translates its rotary movement into a linear movement of the threaded shaft.

Other features and advantages will hereinafter appear.

Figure 1:
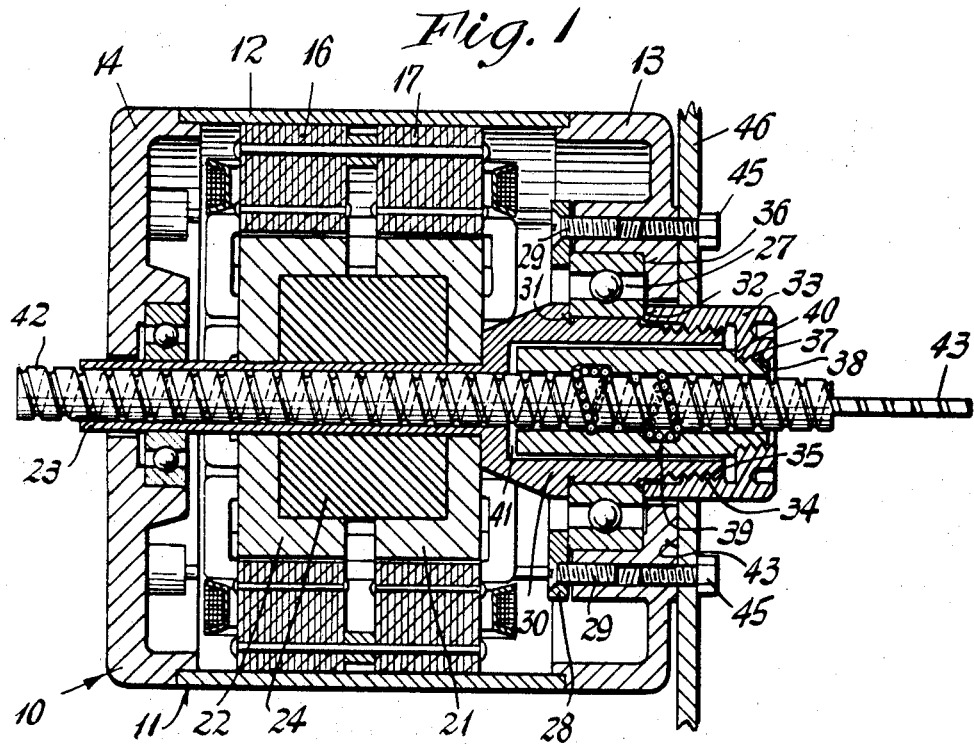
FIGURE 1 is a section of the rotary actuated linear motor of the present invention.
Figure 2:
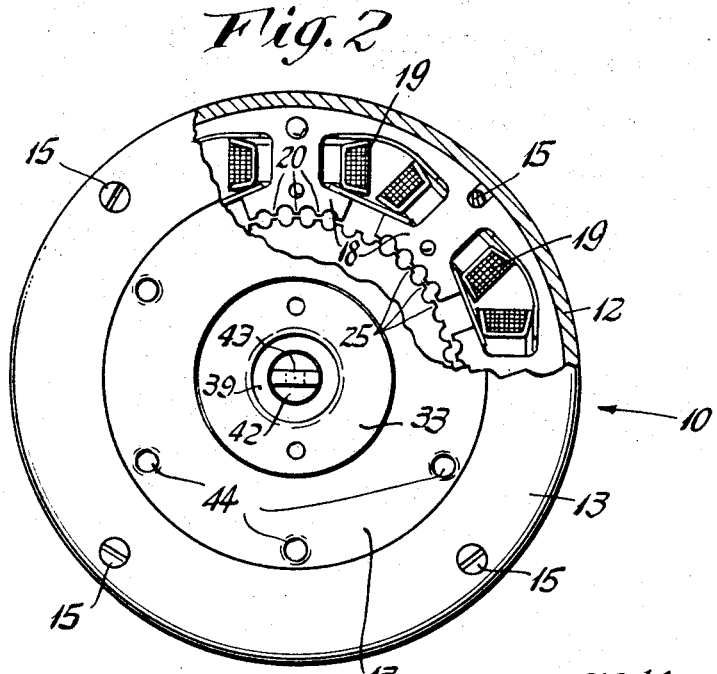
FIG. 2 is a front view thereof with portions broken away to show details of the stator and rotor construction.

Referring to the drawing, the motor is generally indicated by the reference numeral 10 and has a frame 11 that includes a cylindrical tube 12 at whose forward end an end plate 13 is positioned while at its rearward end, an end plate 14 is positioned. The tube and end plates are clamped together as by bolts 15 extending from one end cap to the other.

Mounted on the interior of the tube 12 is a stator that includes a pair of spaced apart pole forming members 16 and 17 with each member being formed to provide a plurality of poles 18. In the embodiment shown herein there are eight poles formed by the stator. Each pole 18 is encircled to be in inductive relation therewith by a winding 19 while the inner periphery of each pole is formed to provide evenly spaced teeth 20.

Cooperating with the stator is a rotor that includes a pair of end caps 21 and 22 that are secured on a hollow shaft 23. The end caps are magnetized by a permanent magnet 24 positioned between the end caps with the end caps and magnet being secured on the shaft in the relationship shown, as by a force fit thereon. The periphery of each end cap is formed with evenly spaced teeth 25 and the pole peripheries and end cap peripheries are radially aligned for cooperative relation between their respective teeth. Thus as the energization of at least some of the windings is changed to change the magnetic polarization of the poles associated therewith, the rotor is caused to rotate a fraction of a tooth pitch with each change. Without a change the rotor maintains its position and hence is braked against movement.

The hollow shaft 23 is supported for rotational movement in a rear roller bearing 26 carried by the end plate 14 and by a roller bearing 27 carried by the front end plate 13. An annular ring 28 secured as by screws 29 engages the outer race of the bearing 27 to clamp it to the plate 13. The inner race of bearing 27 is mounted on an enlarged tubular hub 30 of the shaft 23 and has an inner edge that abuts a peripheral flange 31 thereof. The outer edge of the inner race of the bearing 27 is engaged by an end 32 of a nut 33 having a threaded portion 34 that threadingly engages with peripheral threads 35 formed on the hub 30.

With the above-described construction it will be appreciated that axial thrust leftwardly on the inner race by the nut 33 is transferred through the balls of the bearing 27 to the ring 28 and thus to the end plate 13. Moreover, axial thrust rightwardly on the hollow shaft 23 is also transferred to the end plate 13 by the flange 31 that engages the inner race, the balls of the bearing, and an annular abutment 36 formed on the inner face of the end plate that engages the outer edge of the outer race. Accordingly, the hollow shaft is secured against axial movement and thrust exerted thereon is transmitted to the end plate 13 through the bearing 27.

The nut 33 adjacent its outer edge has an interior reduced diameter portion which is threaded as at 37 to cooperate with threads 38 formed on the end portion of a ball nut 39. The ball nut is thus supported only by the threads 37 and 38 and the parts are dimensioned so that a flange 40 of the nut engages the end of the ball nut while clearance exists as at 41 between the other end of the ball nut 39 and the hollow shaft. The nut 33 when fastened exerts sufficient force on the ball nut to clamp it to the hollow shaft and prevent relative movement therebetween so that the nut rotates with the hollow shaft.

A threaded rod 42, which may be of any desired length extends through the hollow shaft 23 and the ball nut 39 to be threadingly engaged with the latter. The rightward end of the rod 42 is made substantially rectangular as at 43 to enable the rod to be secured to a device desired to be operated in such a manner that the device prevents rotation of the rod 42.

It will thus be understood that when a change in energization of the windings occurs, the hollow shaft will be rotated a fraction of a tooth pitch of the rotor teeth. The shaft 23 will also cause the ball nut 39 to be rotated with it and as the ball nut 39 rotates, it translates its rotation into linear movement of the rod 42 in a well-known manner. The shaft 23 may be rotated in either direction, depending on the manner of change of energization of the windings 19 and it will be appreciated that for one direction of rotation the rod 42 will move rightwardly while for the other direction of rotation, it will move leftwardly. Moreover when the rotor and shaft 23 are stationary, the ball nut prevents the rod from moving axially.

The motor of the present invention has the exterior face of the end plate 13 formed to provide a flat surface 43 with a plurality of threaded apertures 44 extending inwardly therefrom. The apertures are employed to receive bolts 45 so that the motor 10 may be mounted on a flat support 46.

As set forth previously the axial thrust of the rod 42 is transmitted to ball nut 39 and then through the bearing 27 to the end plate 13. This thrust is then transferred to the support 46 because of the end plate 13 being secured directly thereto. Thus, any and all axial thrusts on the motor are carried at an end of the motor and are thus not present throughout the length of the motor. Moreover, with the motor of the present invention just one ball nut is required thereby obviating difficulties in assembly and use that occur when more than one ball nut is employed.

It will accordingly be appreciated that there has been disclosed a rotary actuated linear motor in which the rotational movement of the rotor of the motor is translated into a linear movement of an output rod. The rotary motion of the rotor is applied to a ball nut which cooperates with the threaded rod and as the nut is maintained axially stationary and the rod against rotational movement, the rotary motion thus causes linear movement of the rod. In the motor of the present invention, only one ball nut is employed and it is mounted adjacent the end plate of the motor to which a support for the motor may be secured. The ball nut and the end plate are interconnected solely through the balls of a ball bearing supporting the rotor and thus axial thrust forces are transmitted to the end plate directly without being present throughout the motor. Additionally, the use of a single ball nut and the manner of its interconnection enables the motor of the present invention to be economically manufactured and substantially eliminates tendencies of binding even over a wide temperature range.

Variations and modifications may be made within the scope of the claims and portions of the improvements may be used without others.

I claim:

1. A rotary actuated linear motor comprising a frame including a pair of spaced apart end plates, stator means carried by the frame between the end plates and including a plurality of circularly disposed poles with winding means for the poles to effect magnetization thereof, a shaft mounted for rotation by the end plates by at least one ball bearing having an inner race and an outer race, means clamping the outer race to one of said end plates, a rotor means carried by the shaft for cooperation with the stator means to effect rotation of the rotor means and shaft upon energization of the winding means, a single ball nut carried by the shaft for rotation therewith, means clamping the inner race to the shaft and ball nut, a threaded rod extending through at least said ball nut for threading cooperation therewith to translate rotation of the ball nut into linear movement of the rod and in which the means clamping the inner race to the shaft and ball nut includes a member engaging the inner race and operatively connected to the shaft and ball nut and constituting the sole connection between said shaft and nut.

2. A rotary actuated linear motor comprising a frame including a pair of spaced apart end plates, one of said end plates having means formed thereon for attaching the motor to a support, stator means carried by the frame between the end plates and including a plurality of circularly disposed poles with winding means for the poles to effect magnetization thereof, a shaft mounted for rotation by the end plates, rotor means carried by the shaft for cooperation with the stator means to effect rotation of the rotor means and shaft upon energization of the winding means, a single ball nut carried by the shaft adjacent said one end plate for rotation therewith, said ball nut being mounted by a clamping means having engagement with said shaft and said ball nut and constituting the only connection between the ball nut and the shaft and a threaded rod extending through at least said ball nut and said one end plate for threading cooperation with said ball nut to translate rotation of the ball nut into linear movement of the rod.

3. A rotary actuated linear motor comprising a frame including a pair of spaced apart end plates, one of said end plates having means formed thereon for attaching the motor to a support, stator means carried by the frame between the end plates and including a plurality of circularly disposed poles with winding means for the poles to effect magnetization thereof, a hollow shaft mounted for rotation by the end plates by at least one ball bearing having an inner race and an outer race, means clamping the outer race to one of said end plates, rotor means carried by the hollow shaft for cooperation with the stator means to effect rotation of the rotor means and hollow shaft upon energization of the winding means, a single ball nut carried by the shaft for rotation therewith, means clamping the inner race to the shaft and ball nut with said ball nut being mounted adjacent said one end plate, said clamping means including a member that is interconnected with the shaft and ball nut to constitute the sole connection between the ball nut and shaft and a threaded rod extending through at least said ball nut for threading cooperation with the ball nut to translate rotation of the ball nut into linear movement of the rod.

4. The invention as defined in claim 3 in which the ball bearing includes balls rotatably mounted between the inner and outer races and in which said ball nut is interconnected to said end plate only through said balls.

5. The invention as defined in claim 4 in which the member engages the inner race and translates axial thrust on the threaded rod to said inner race through the member whereby axial thrust on said shaft is obviated.

References Cited

UNITED STATES PATENTS

| | | | |
|---|---|---|---|
| 2,696,579 | 12/1954 | Van der Veer | 310—83 |
| 2,780,740 | 2/1957 | Roman | 310—80 |
| 2,956,188 | 10/1960 | White | 310—83 |
| 2,978,621 | 4/1961 | Martinek | 310—83 |
| 2,979,639 | 8/1961 | Phillips | 310—66 |
| 3,159,758 | 12/1964 | Hemperly | 310—83 |
| 3,165,656 | 1/1965 | Korthaus | 310—83 |
| 3,167,671 | 1/1965 | Staak | 310—83 |
| 3,268,750 | 8/1966 | Gerber | 310—96 |

J. D. MILLER, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,308                             September 17, 1968

William O. Henschke

It is certified that error appears in the above identified patent and that said Letters Patent are hereby corrected as shown below:

Column 4, line 63, "2,979,639" should read -- 2,997,639 --.

Signed and sealed this 3rd day of February 1970.

(SEAL)
Attest:

Edward M. Fletcher, Jr.                     WILLIAM E. SCHUYLER, JR.
Attesting Officer                              Commissioner of Patents